US010578025B2

(12) United States Patent
Jensen et al.

(10) Patent No.: US 10,578,025 B2
(45) Date of Patent: Mar. 3, 2020

(54) HYBRID AIRCRAFT TURBINE ENGINE STARTING SYSTEM AND METHOD

(71) Applicant: The Boeing Company, Chicago, IL (US)

(72) Inventors: Chris L. Jensen, Florissant, MO (US); Thomas W. Omohundro, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 755 days.

(21) Appl. No.: 15/154,239

(22) Filed: May 13, 2016

(65) Prior Publication Data

US 2017/0328282 A1 Nov. 16, 2017

(51) Int. Cl.
*F02C 7/277* (2006.01)
*B64D 41/00* (2006.01)
*F02C 7/32* (2006.01)
*F02C 7/275* (2006.01)

(52) U.S. Cl.
CPC .............. *F02C 7/277* (2013.01); *B64D 41/00* (2013.01); *F02C 7/275* (2013.01); *F02C 7/32* (2013.01); *F05D 2220/323* (2013.01); *F05D 2220/50* (2013.01); *F05D 2260/85* (2013.01)

(58) Field of Classification Search
CPC ............ F05D 2220/50; F05D 2260/85; F05D 2220/323; F15B 1/024; F15B 1/022; F02C 7/32; B64D 41/00
See application file for complete search history.

(56) References Cited

U.S. PATENT DOCUMENTS

| 3,901,026 | A | * | 8/1975 | Quinn | F02C 3/36 60/39.15 |
| 4,068,468 | A | * | 1/1978 | Wood | F01L 25/066 417/323 |
| 5,174,109 | A | * | 12/1992 | Lampe | B64D 41/00 60/788 |
| 6,316,841 | B1 | * | 11/2001 | Weber | F02C 7/277 244/118.5 |
| 6,840,479 | B1 | * | 1/2005 | Przygoda | B64D 41/00 244/58 |
| 7,687,927 | B2 | | 3/2010 | Shander et al. | |

(Continued)

*Primary Examiner* — Ehud Gartenberg
*Assistant Examiner* — Jacek Lisowski
(74) *Attorney, Agent, or Firm* — Moore Intellectual Property Law, PLLC

(57) ABSTRACT

A system and method for starting an aircraft turbine engine includes a primary starting subsystem and a secondary starting subsystem. The primary starting subsystem is coupled to a shaft of the aircraft turbine engine and has a dedicated power source. The secondary starting subsystem is also coupled to the shaft of the aircraft turbine engine and has a shared power source. A controller controls the operation of the primary starting subsystem and the secondary starting subsystem while starting the aircraft turbine engine. The primary starting subsystem may be an Auxiliary Power Unit coupled to an Air Turbine Starter. The secondary starting subsystem may be a Starter Generator coupled to a battery also used to power the Emergency Hydraulic System. The primary starting subsystem is always operated at full power during starting while the secondary starting subsystem is preferably operated in a sequence of different power levels.

20 Claims, 5 Drawing Sheets

(56) References Cited

U.S. PATENT DOCUMENTS

| | | | | |
|---|---|---|---|---|
| 8,666,633 B2* | 3/2014 | Ertz | ................... | F02C 7/26 |
| | | | | 477/30 |
| 9,024,467 B2 | 5/2015 | Nguyen | | |
| 2009/0121073 A1 | 5/2009 | Doane et al. | | |
| 2012/0119020 A1* | 5/2012 | Burns | ................... | B64D 27/00 |
| | | | | 244/58 |
| 2013/0031912 A1* | 2/2013 | Finney | ................... | F01D 15/10 |
| | | | | 60/778 |
| 2013/0204506 A1* | 8/2013 | Ertz | ................... | F02C 7/26 |
| | | | | 701/100 |
| 2014/0020401 A1* | 1/2014 | Taneja | ................... | F02C 7/26 |
| | | | | 60/778 |

* cited by examiner

US 10,578,025 B2

HYBRID AIRCRAFT TURBINE ENGINE STARTING SYSTEM AND METHOD

FIELD

This disclosure relates generally to a hybrid system and method for starting an aircraft turbine engine.

BACKGROUND

Turbine engines of the type used in aircraft must be accelerated during startup to a high rotational speed to provide sufficient air compression for self-sustaining operation. Many aircraft include an Airframe Mounted Accessory Drive (AMAD) which is coupled to the turbine engine drive shaft. During startup, a drive source is coupled to the AMAD to provide the rotational energy required for starting the turbine engine. In larger aircraft, an Auxiliary Power Unit (APU) provides pneumatic power to an Air Turbine Starter (ATS) coupled to the AMAD during startup (the APU/ATS starting system). However, an APU/ATS starting system must be sized to ensure start capability for higher altitude on warmer days, which increases system weight, volume, cost, and aircraft integration impacts (e.g., duct size and fuel line size). Other aircraft may include an electrical motor (e.g., a Starter Generator or SG) having a shaft coupled directly to the AMAD to rotate the turbine engine shaft during startup. The electrical motor is typically powered by an on-board battery. However, the battery in such a system must be either significantly oversized to ensure start capability on colder days or a separate battery heater must be provided. The use of a battery heater causes startup delays while the battery is warmed and requires an external source of power. Modern aircraft designs have increased power requirements and a reduced volume for equipment.

Accordingly, there is a need for a system and method for starting an aircraft turbine engine which overcomes the problems recited above.

SUMMARY

In a first aspect, a system for starting an aircraft turbine engine includes a primary starting subsystem, a secondary starting subsystem and a controller. The primary starting subsystem is coupled to a shaft of the aircraft turbine engine and has a dedicated power source. The secondary starting subsystem is coupled to the shaft of the aircraft turbine engine and has a shared power source. The controller controls the operation of the primary starting subsystem and the secondary starting subsystem while starting the aircraft turbine engine.

In one further embodiment, the primary starting subsystem may be an auxiliary power unit coupled to an air turbine starter. The auxiliary power unit may be the dedicated power source. The auxiliary power unit may have a total output capacity that is less than a total amount of power required to start the aircraft turbine engine. In another further embodiment, the primary starting subsystem may be an integrated power unit coupled to a starter generator. The integrated power unit may be the dedicated power source. The integrated power unit may have a total output capacity that is less than a total amount of power required to start the aircraft turbine engine. In yet another further embodiment, the primary starting subsystem may be a jet fuel starter coupled to the aircraft turbine engine via a gearbox. The jet fuel starter may be the dedicated power source. The jet fuel starter may have a total output capacity that is less than a total amount of power required to start the aircraft turbine engine.

The secondary starting subsystem may be a starter generator. The shared power source may be a battery used to power one or more other aircraft systems. The one or more other aircraft systems may be the emergency hydraulic system. The controller may be configured to operate the primary starting subsystem at full power throughout a sequence of periods comprising a start process. The controller may be configured to selectively operate the secondary starting subsystem at less than full power during one or more of a sequence of periods comprising a start process. The sequence of periods may be four periods, and the controller may be configured to operate the secondary starting subsystem at zero power during a first and fourth of the four periods, at less than full power during a second of the four periods and at full power during a third of the four periods. The second period may commence after an accumulator coupled to a hydraulic system coupled to the aircraft turbine engine becomes fully charged.

In a second aspect, a method of starting an aircraft turbine engine. A primary starting subsystem coupled to a shaft of the aircraft turbine engine and having a dedicated power source is operated at full power during an entire start process. A secondary starting subsystem coupled to the shaft of the aircraft turbine engine and having a shared power source is operated selectively at less than full power and at full power at different periods during the start process. The start process may consist of four sequential periods and the secondary starting subsystem may be operated at less than full power during a second of the four sequential periods. The secondary starting subsystem may be operated at zero power during a first and a fourth of the four sequential periods and at full power during a third of the four sequential periods.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Commercial aircraft have traditionally been based on an architecture that includes federated subsystems having a significant number of line replaceable units. However, such dedicated subsystems add more weight and volume than architectures based on more integrated subsystems which are electrically powered. The hybrid system and method for starting an aircraft turbine engine disclosed herein employs two separate power sources (e.g., power subsystems) to provide startup power. Aircraft systems require electrical and pneumatic power to operate their subsystems. An aircraft's Secondary Power System integrates mechanical systems that supply power to support the requirements for these functions on the aircraft. Integration typically includes a dedicated engine starter in the form of either an Air Turbine Starter or a Starter Generator. The system and method disclosed herein utilizes power from both an Air Turbine Starter (ATS) and a Starter Generator during the engine starting cycle for normal start ground engine starting. The ATS receives bleed air from a conventional Auxiliary Power Unit (APU). The Starter Generator receives power from on-board batteries that are also used to supply power for other systems, including, for example, the Emergency Hydraulic System that is used in certain flight conditions. The battery (or batteries) required for the Emergency Hydraulic System can support a significant portion, but not all, of the engine start power requirements. By coupling the Emergency Hydraulic System battery to a Starter Generator (the secondary starting subsystem) during the start process and by employing a smaller APU coupled to the ATS (the APU/ATS or the primary starting subsystem), and by, in a further embodiment, staging the use of the battery-powered Starter Generator and the APU/ATS during the startup procedure (as described in detail below), a lighter and smaller hybrid starting system for an aircraft turbine engine is achieved.

Figure 1:
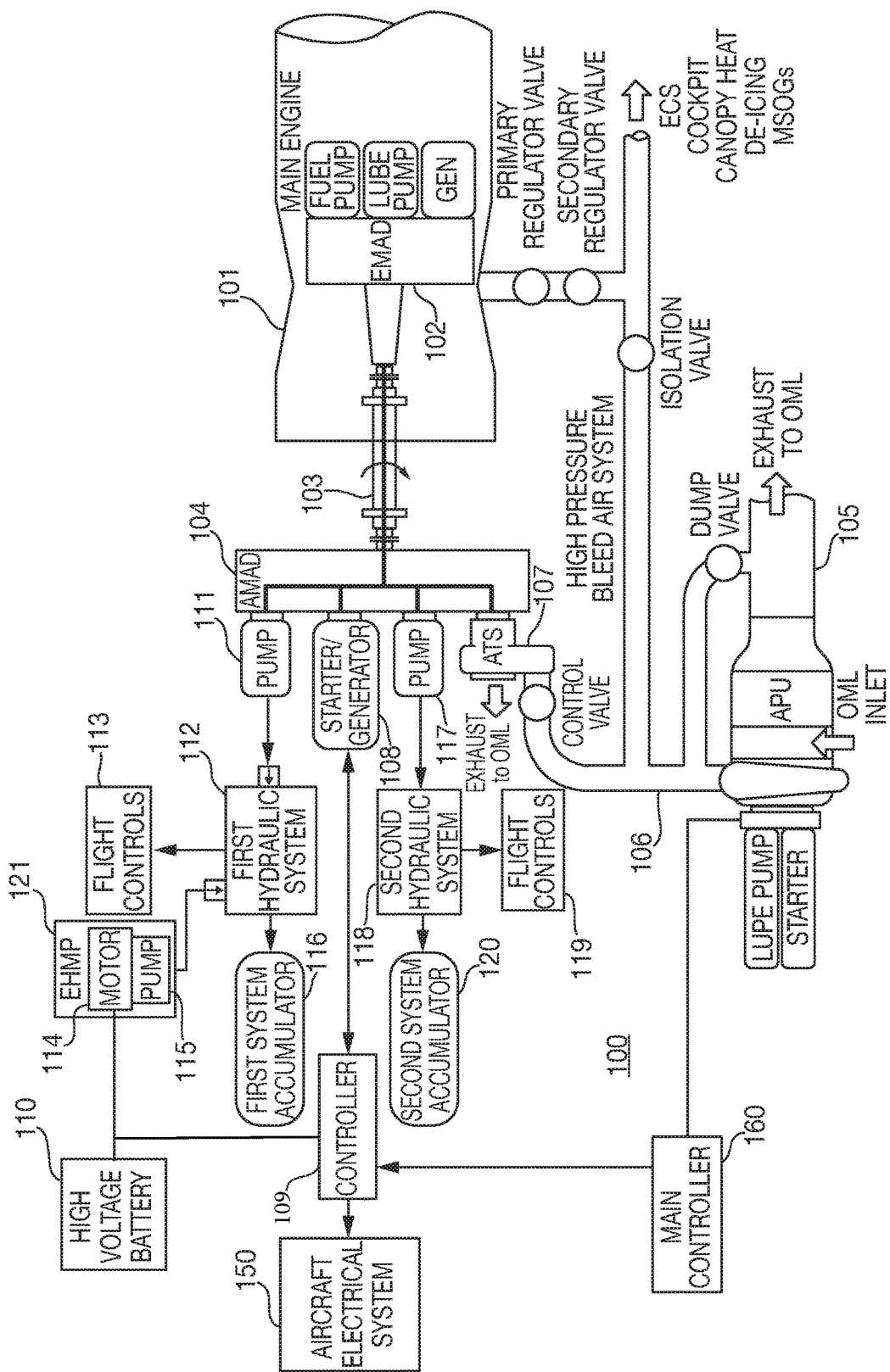
FIG. 1 is a block diagram of a first embodiment of a starting system for an aircraft turbine engine according to the present disclosure.

Referring now to the drawings, and in particular to FIG. 1, a first embodiment of a hybrid system 100 for starting an aircraft turbine engine includes two starting subsystems, a primary starting subsystem including APU 105 and ATS 107 and a secondary starting subsystem consisting of starter generator 108 and controller 109. System 100 includes a main turbine engine 101 having an integral Engine-Mounted Accessory Drive (EMAD) 102 that acts as a gearbox coupled to the main engine drive shaft. EMAD 102 is coupled to an Airframe Mounted Accessory Drive (AMAD) 104 via a driveshaft 103. AMAD 104 also acts as a gearbox and is coupled to a number of accessories, including an ATS 107, two separate pumps 111, 117 and a Starter Generator 108. ATS 107 is coupled to an APU 105 via a compressed air line 106. Pump 111 is coupled to first hydraulic system 112 for operating certain of the flight controls 113 after main engine 101 is started. Pump 111 is also coupled to an Emergency Hydraulic Motor Pump (EHMP) 121 having an electric motor 114 for operating pump 115. EHMP 121 is part of the Emergency Hydraulic System. Electric motor 114 is coupled to a high voltage battery 110. EHMP 121 provides power to operate first hydraulic system 112 during certain situations, while pump 111 provides power to operate first hydraulic system 112 after engine startup. First hydraulic system 112 is also coupled to a first system accumulator 116. Pump 117 is coupled to a second hydraulic system 118 for operating other flight controls 119 (e.g., flight controls only needed after the start of the main turbine engine), as no alternative electric motor/pump is provided to second hydraulic system 118. Second hydraulic system 118 is also coupled to a second accumulator 120. Finally, starter generator 108 is coupled to high voltage battery 110 (e.g., the on-board battery or batteries used to power the Emergency Hydraulic System) via controller 109 to power starter controller 108 during startup, as discussed below. Controller 109 is also coupled to the aircraft electrical system 150 to provide power from starter generator 108 to the aircraft electrical system 150 after startup of turbine engine 101. As evident, system 100 is a hybrid system that employs two separate starting sub-systems, a primary starting subsystem consisting of APU 105 and ATS 107, and a secondary starting subsystem consisting of starter generator 108 and controller 109. Starter generator 108 may, for example, replace a conventional generator used to power the aircraft electrical system 150 after startup of the turbine engine 101. A main controller 160 controls the operation of the primary and secondary starting subsystems during the starting process, as discussed with respect to FIGS. 2 to 4 below.

An aircraft's turbine engine performance is limited on hot days due to material limits but such engine performs well at cold day conditions. The turbine engine performance also decreases with decreasing pressure altitude. Batteries and starter generators are not affected by pressure altitude directly and generally have no performance degradation at warm temperatures. However, battery capacity is typically degraded at colder conditions. As a result, aircraft batteries must be chosen larger than necessary to ensure adequate operation at the low end of the specified temperature ranges. By integrating a hybrid system employing both a turbine-engine-based APU/ATS and battery-powered starter generator, such deficiencies compensate for each other and allow the APU, ATS and starter generator to consist of smaller sized units.

The process of starting main turbine engine 101 (FIG. 1) involves numerous systems that need to be considered. For example, during an engine start the mechanical, fluid and pneumatic systems in the aircraft are all active and demand some amount of power. However, the primary load during the start is engine drag and inertia, while there are also other losses and inertial loads in the gearboxes and aircraft accessories coupled to the engine. Such losses are present throughout the start process. The hydraulic systems start to supply pressurized hydraulic fluid to the aircraft systems immediately on the initiation of a start. Hydraulic system leakage, line swell and accumulator charging (e.g., accumulators 116, 120 in FIG. 1) are the primary hydraulic system demands. Hydraulic system leakage is a continuous demand varying in magnitude as system pressure increases with the majority of the start process having a fixed flow demand (regulated pressure) after accumulator charging is complete. Accumulators 116, 120 will be depleted prior to initiation of the start process and fill during the first five to ten seconds of the start attempt. If the start system battery 110 is engaged at start initiation, some of the stored energy in such battery will be transferred to the stored energy in the accumulators. This transfer can be avoided by delaying the use of the battery-powered starter generator 108 until the accumulators 116, 120 are charged.

Figure 2:
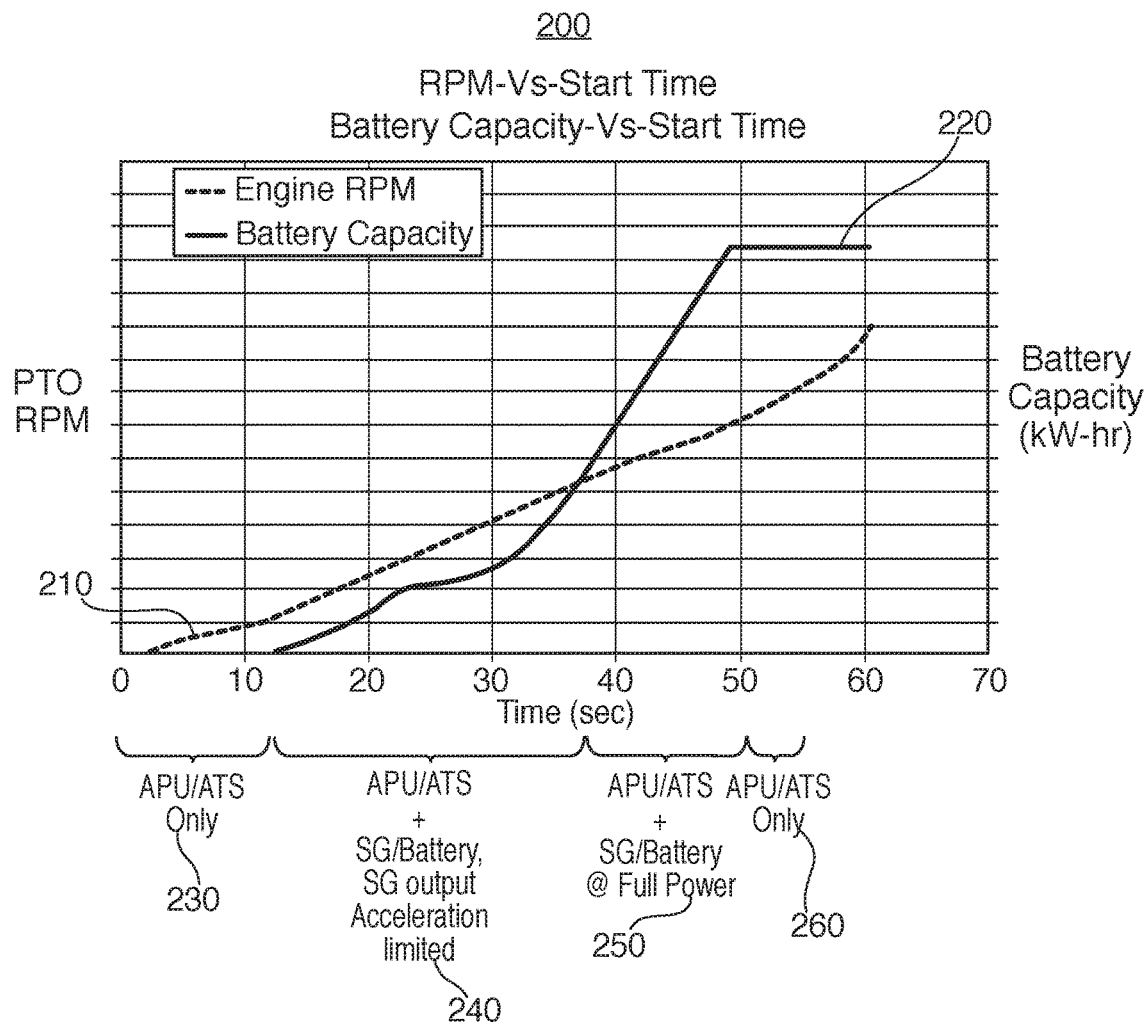
FIG. 2 is a graph showing the operation over time of the starting system for an aircraft turbine engine according to the present disclosure.

In the system and method of the present disclosure, the two separate power sources (or subsystems), the APU 105/ATS 107 and battery-powered starter generator 108 may be operated in a staged sequence to optimize the transfer of power to the aircraft turbine engine, as shown in FIG. 2. In particular, once the engine start sequence is initiated, the ATS 107 start torque follows a predictable torque speed profile for the current operating conditions. The assist provided by the starter generator 108 may be tailored to the loads, and the on line speed may be varied depending on demand. Starter generator 108 also may provide a constant power output in a latter part of the start process. This is useful because the power output of ATS 107 drops off up to starter cutout. In particular, as shown in the graph 200 in FIG. 2, the process of starting a turbine engine 101 (FIG. 1) requires that the engine turbine shaft revolutions per minute (RPM) be ramped up over a predetermined time period (e.g., about sixty seconds). Line 210 in graph 200 shows how the turbine engine shaft RPM increases over time during the start process. By staging the use of the secondary starting subsystem, a more efficient starting process may be achieved, allowing the entire starting system to be lighter and less expensive. Four different periods (stages) 230, 240, 250, 260 of starting are shown in FIG. 2. In each period 230, 240, 250, 260, the primary starting subsystem is employed at full power. However, in the first period 230, the secondary starting subsystem is preferably not used at all. As shown in graph 200, the power drawn from battery 110, represented by line 220, is zero during time period 230. This ensures that no energy is merely transferred from battery 110 to one or both of the hydraulic system accumulators 116, 120. In the second period 240, the secondary starting subsystem is, preferably, operated at less than full power to preserve battery power as additional torque is not necessary during this time period. In the third time period 250, the secondary starting subsystem is, preferably, operated at full power to ensure adequate torque to start engine 101. Finally, at time period 260, the secondary starting subsystem is preferably not operated all as the torque contribution by the primary starting subsystem is enough to ensure engine start. Sequencing of the secondary start system may vary depending on current environmental conditions and/or on equipment requirements. Engine start times (faster or slower) can be optimized by adjusting the output of the secondary starting subsystem. In addition, this system architecture can provide additional redundancy to performing engine starting.

Figure 3:
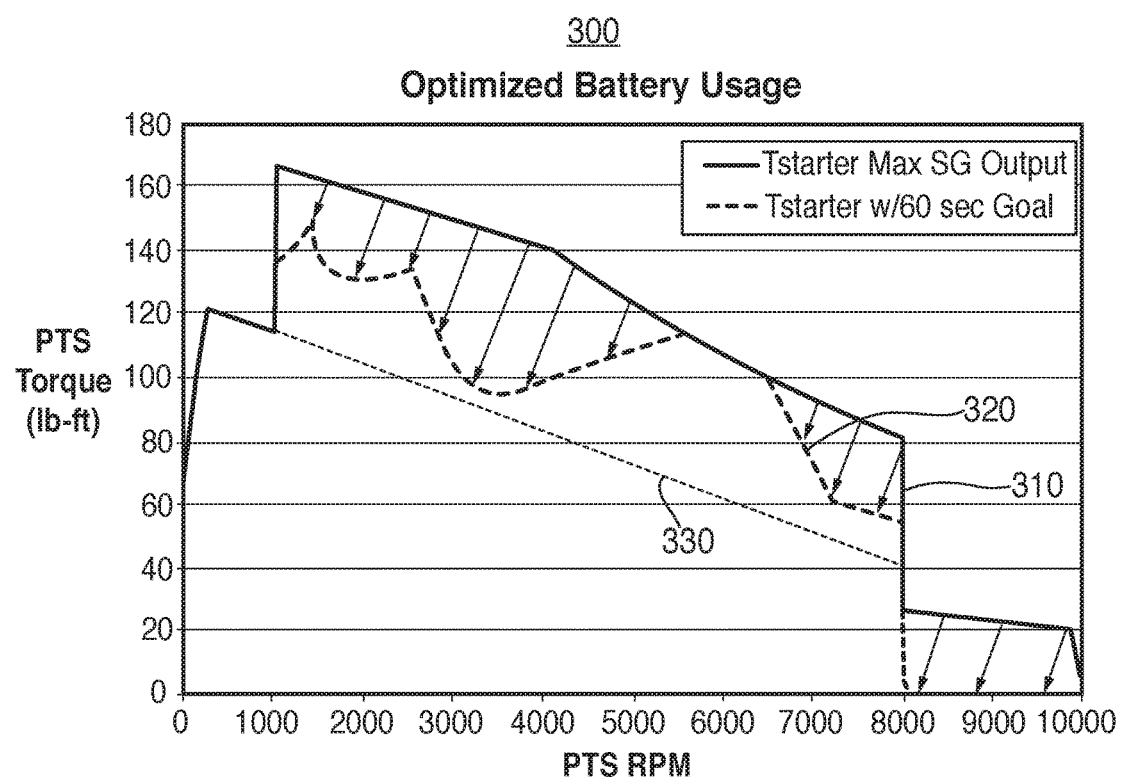
FIG. 3 is a graph showing the optimized battery usage of the starting system for an aircraft turbine engine according to the present disclosure.

Referring now to FIG. 3, an example plot 300 is provided of the torque profile of a typical engine start sequence based on the hybrid aircraft turbine starting system 100 shown in FIG. 1, i.e., a system employing APU 105/ATS 107 as a primary starting subsystem and a battery-powered starter generator 108 as a secondary starting subsystem. Line 330 represents the potential total torque (power) contributed to the start by the primary starting subsystem. Line 310 shows the potential total torque (power) available when the battery powered starter generator 108 and the APU 105/ATS 107 are both operated at full power. Line 320 reflects the reduction in torque required when the starter generator 108 is staged as in FIG. 2. This type of control minimizes the power output of starter generator 108 during three of the four starting periods (stages) and thus the battery capacity consumed during the start attempt can be greatly reduced, thereby reducing the battery load rating requirements. As a result, the contribution of the battery and starter generator 108 can be minimal in normal operating conditions and can be increased up to full starter generator 108 capacity to cover high engine drag conditions that are typically present during operation at low temperatures or low APU 105 performance at high temperatures.

At the end of the engine start sequence (during period 260 in FIG. 2), starter generator 108 is disengaged and the primary starting subsystem (e.g., APU 105/ATS 107) will continue to support the engine start up to starter cutout. Because there is sufficient torque available from the rotation of turbine engine 101 at this point, no additional power is required from starter generator 108 to meet the acceleration requirements for starting the turbine engine.

Figure 4:
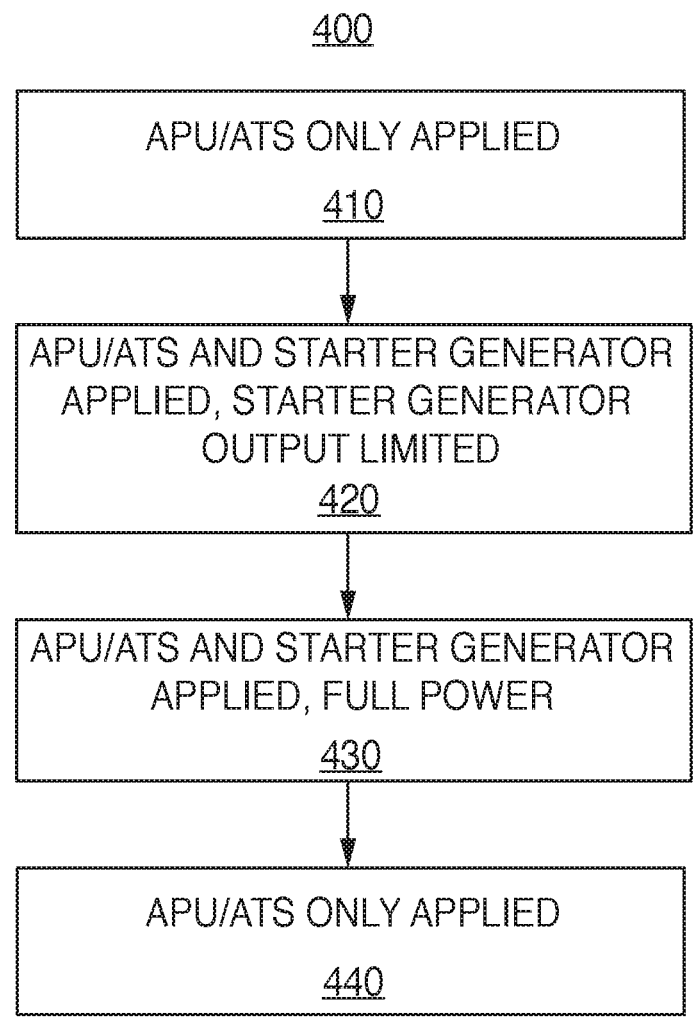
FIG. 4 is a flowchart showing the operation of the starting method for an aircraft turbine engine according to the present disclosure.

Referring now to FIG. 4, a flowchart 400 is shown of the staged start sequence that is employed in a further embodiment of the hybrid aircraft turbine engine starting system and method of the present disclosure. In particular, the starting process shown in flowchart 400 involves a series of steps controlled by main controller 160. During a first period (step 410), the primary starting subsystem (ATU 105/ATS 107) is preferably coupled to engine 101 to provide full power to start rotating the turbine engine shaft, while the secondary starting subsystem (starter generator 108) is preferably not powered at all. During a second period (step 420), the primary starting subsystem (ATU 105/ATS 107) continues to provide full power, while the secondary starting subsystem (starter generator 108) is preferably operated at a less than full power level. During a third period (step 430), the primary starting subsystem (ATU 105/ATS 107) continues to provide full power, while the secondary starting subsystem (starter generator 108) is preferably operated at full power. Finally, during a fourth period (step 440), the primary starting subsystem (ATU 105/ATS 107) continues to provide full power, while the secondary starting subsystem (starter generator 108) is preferably disengaged from engine 101.

The principles of the present disclosure may be applied to any conventional system for starting a turbine engine. The APU/ATS configuration shown in FIG. 1 is one such system. Many other types of starting systems are used in different types of aircraft. However, each such starting system typically includes a continuous power source and an interface for coupling the continuous power source to the turbine engine shaft. Example continuous power sources used in starting systems include (1) an Auxiliary Power Unit (APU); (2) a Jet Fuel Starter (JFS); (3) an Integrated Power Unit (IPU); and (4) an aircraft ground cart power unit. The APU, JFS, IPU or aircraft ground cart power unit may be coupled to the turbine engine shaft in a number of ways, e.g., via: (1) an Air Turbine Starter (ATS) as described with respect to FIG. 1; (2) a direct coupling by means of a shaft/gearbox; (3) a hydraulic system; or (4) a starter generator. In each such system, the size of the continuous power source (i.e., a primary starting subsystem as discussed above) may be reduced when a secondary power source (i.e., a secondary starting subsystem as discussed above), preferably based on a stored energy source, is added. In FIG. 1, as discussed above the secondary power source consists of battery 110 selectively coupled to starter generator 108 under the control of main controller 160. Other secondary sources may be substituted, including a compressed air/turbine-based system or a compressed air/fuel/turbine-based system.

Figure 5:
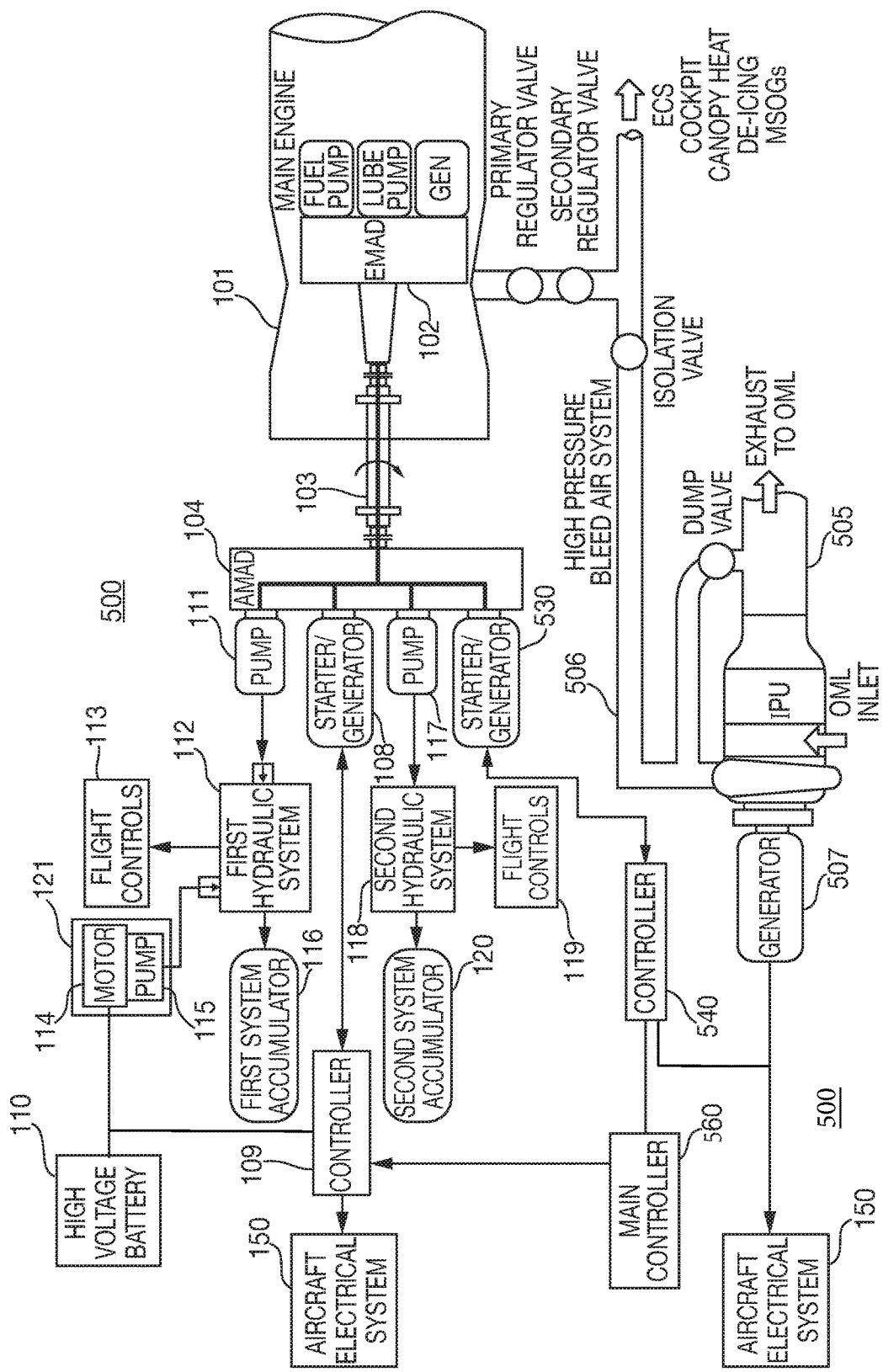
FIG. 5 is a block diagram of a second embodiment of a starting system for an aircraft turbine engine according to the present disclosure.

An alternative embodiment based on a different type of primary starting subsystem is shown in FIG. 5. In particular, system 500 employs two separate starter generator starting subsystems, with same secondary starting system as used in the first embodiment (i.e., starter generator 108 coupled to high voltage battery 110 via controller 109). In system 500, however, the primary starting subsystem consisting of an IPU 505 having an integral generator 507 coupled to a starter generator 530 via a separate controller 540. Integral generator 507 is also coupled to aircraft electrical system 150 to supply power thereto prior to the start of main engine 101. IPU 505 also provides high pressure air via air pressure line 506 for various aircraft functions prior to the start of main engine 101. A main controller 560 controls the operation of the primary and secondary starting subsystems. In this embodiment, the primary starting subsystem operates at full output over the complete course of the startup operation, in the same manner as the primary starting subsystem consisting of APU 105 and ATS 107 in FIG. 1, while the secondary starting system also may operate at full power throughout the starting process, may operate in the same manner as discussed with respect to FIGS. 2 to 4 above or may be otherwise selectively operated.

The staged starting process discussed herein provides a battery power management scheme that results in reduced capacity and sizing requirements for the power sources. This hybrid system and method of the present disclosure thus provides an advantage in terms of system weight and cost when compared to traditional single power source engine start systems by utilizing available power sources. In particular, the present system and method offers: (1) a reduced component weight and size; (2) reduced starter capacity requirements for the starter generator; (3) the use of existing emergency battery systems to supplement other aircraft functions (engine starting and motoring); (4) a smaller battery sizing due to delayed engagement of starter generator; (5) no effects from forward or reverse engine wind milling prior to initiation of the engine start; (6) a more consistent performance over the aircraft operating range of temperature and altitude based on the two types of technologies used for providing starting power; (7) smaller APU and ATS sizing while retaining capacity to provide power for other systems during both ground and flight operation; (8) the elimination of the transfer of stored energy between aircraft systems thereby focusing stored energy systems on useful work; (9) the use of 270 Volts direct current (VDC) primary electrical power which is more prevalent on recent aircraft designs; and (10) the ability to provide continuous power output to support normal ground aircraft support.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for starting an aircraft turbine engine, the system comprising:
    a primary starting subsystem coupled to a shaft of the aircraft turbine engine, the primary starting subsystem having a dedicated power source;
    a secondary starting subsystem coupled to the shaft of the aircraft turbine engine, the secondary starting subsystem having a second power source distinct from the dedicated power source;
    an accumulator coupled to a hydraulic system coupled to the aircraft turbine engine; and
    a computer controller configured to cause the primary starting subsystem to operate at full power during a sequence of sequential time periods comprising four sequential time periods, the computer controller further configured to cause the secondary starting subsystem to operate at zero power during a first sequential time period of the four sequential time periods and a fourth sequential time period of the four sequential time periods, at less than full power during a second sequential time period of the four sequential time periods and at full power during a third sequential time period of the four sequential time periods, and wherein the computer controller is configured to commence the second sequential time period of the four sequential time periods responsive to the accumulator becoming fully charged.

2. The system of claim 1, wherein the primary starting subsystem comprises an auxiliary power unit coupled to an air turbine starter.

3. The system of claim 2, wherein the auxiliary power unit comprises the dedicated power source.

4. The system of claim 3, wherein the auxiliary power unit has a total output capacity that is less than a total amount of power required to start the aircraft turbine engine.

5. The system of claim 1, wherein the primary starting subsystem comprises an integrated power unit coupled to a starter generator.

6. The system of claim 5, wherein the integrated power unit comprises the dedicated power source.

7. The system of claim 6, wherein the integrated power unit has a total output capacity that is less than a total amount of power required to start the aircraft turbine engine.

8. The system of claim 1, wherein the primary starting subsystem comprises a jet fuel starter coupled to the aircraft turbine engine via a gearbox.

9. The system of claim 8, wherein the jet fuel starter comprises the dedicated power source.

10. The system of claim 9, wherein the jet fuel starter has a total output capacity that is less than a total amount of power required to start the aircraft turbine engine.

11. The system of claim 1, wherein the secondary starting subsystem comprises a starter generator.

12. The system of claim 11, wherein the second power source comprises a battery electrically coupled to an aircraft system distinct from the primary starting subsystem and the secondary starting subsystem.

13. The system of claim 12, wherein the aircraft system comprises an emergency hydraulic system.

14. The system of claim 1, wherein the primary starting subsystem is coupled to the shaft via an airframe mounted accessory drive.

15. The system of claim 1, wherein the secondary starting subsystem is coupled to the shaft via an airframe mounted accessory drive.

16. The system of claim 15, wherein the hydraulic system is coupled to the aircraft turbine engine via the airframe mounted accessory drive.

17. The system of claim 1, wherein the aircraft turbine engine charges the accumulator during the first sequential time period.

18. A method of starting an aircraft turbine engine, the method comprising:
    operating a primary starting subsystem coupled to a shaft of the aircraft turbine engine and having a dedicated power source at full power during a sequence of sequential time periods comprising four sequential time periods; and
    operating a secondary starting subsystem coupled to the shaft of the aircraft turbine engine and having a second power source distinct from the dedicated power source, wherein the secondary starting subsystem is operated at zero power during a first sequential time period of the four sequential time periods and a fourth sequential time period of the four sequential time periods, at less than full power during a second sequential time period of the four sequential time periods and at full power during a third sequential time period of the four sequential time periods, and wherein the second sequential time period of the four sequential time periods commences responsive to an accumulator coupled to a hydraulic system coupled to the aircraft turbine engine becoming fully charged.

19. The method of claim 18, further comprising charging the accumulator during the first sequential time period.

20. The method of claim 18, wherein the primary starting subsystem comprises an auxiliary power unit coupled to an air turbine starter.

\* \* \* \* \*